(12) United States Patent
Chang et al.

(10) Patent No.: US 8,931,017 B2
(45) Date of Patent: Jan. 6, 2015

(54) CHANNEL SCANNING METHOD FOR DIGITAL VIDEO BROADCASTING SATELLITE SIGNAL

(71) Applicant: MStar Semiconductor, Inc., Hsinchu Hsien (TW)

(72) Inventors: Chu-Hsin Chang, Hsinchu County (TW); Kai-Wen Cheng, Hsinchu County (TW); Yi-Ying Liao, Hsinchu County (TW); Tung-Sheng Lin, Hsinchu County (TW); Tai-Lai Tung, Hsinchu County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/094,891

(22) Filed: Dec. 3, 2013

(65) Prior Publication Data

US 2014/0157331 A1    Jun. 5, 2014

(30) Foreign Application Priority Data

Dec. 3, 2012    (TW) .............................. 101145305 A

(51) Int. Cl.
*H04N 7/20*        (2006.01)
*H04N 21/61*       (2011.01)
*H04H 40/90*       (2008.01)
*H04N 21/438*      (2011.01)
*H04H 20/26*       (2008.01)

(52) U.S. Cl.
CPC ........... *H04N 21/6193* (2013.01); *H04H 40/90* (2013.01); *H04N 21/4382* (2013.01); *H04N 21/4383* (2013.01); *H04H 20/26* (2013.01)
USPC ............. 725/72; 348/731; 348/732; 348/741; 455/161.1; 455/150.1; 370/480

(58) Field of Classification Search
None
See application file for complete search history.

(56) References Cited

U.S. PATENT DOCUMENTS

| | | | |
|---|---|---|---|
| 6,038,433 A * | 3/2000 | Vegt ............................ | 455/161.1 |
| 2002/0100057 A1 * | 7/2002 | Brown .......................... | 725/111 |
| 2005/0054345 A1 * | 3/2005 | Lee .............................. | 455/434 |
| 2006/0038926 A1 * | 2/2006 | Mayer et al. ................. | 348/731 |
| 2008/0096554 A1 * | 4/2008 | Kim .............................. | 455/434 |
| 2008/0278634 A1 * | 11/2008 | Huang et al. ................. | 348/734 |
| 2009/0066850 A1 * | 3/2009 | Wu ............................... | 348/731 |
| 2010/0003915 A1 * | 1/2010 | Shamain et al. ............. | 455/3.02 |
| 2011/0135042 A1 * | 6/2011 | Tseng et al. .................. | 375/344 |

* cited by examiner

*Primary Examiner* — John Schnurr
*Assistant Examiner* — Cynthia Fogg
(74) *Attorney, Agent, or Firm* — WPAT, PC; Justin King

(57) ABSTRACT

A channel scanning method for Digital Video Broadcasting-Satellite (DVB-S) signals is provided. The method includes: scanning a radio frequency (RF) signal according to a normal frequency step; when the $N^{th}$ channel is detected, obtaining a difference between a low boundary of an $N^{th}$ channel and a high boundary of an $(N-1)^{th}$ channel; and, when the difference is within a predetermined bandwidth range, scanning the RF signal between the high boundary of the $(N-1)^{th}$ channel and the low boundary of the $N^{th}$ channel according to a narrow frequency step. The normal frequency step is greater than the narrow frequency step.

9 Claims, 7 Drawing Sheets

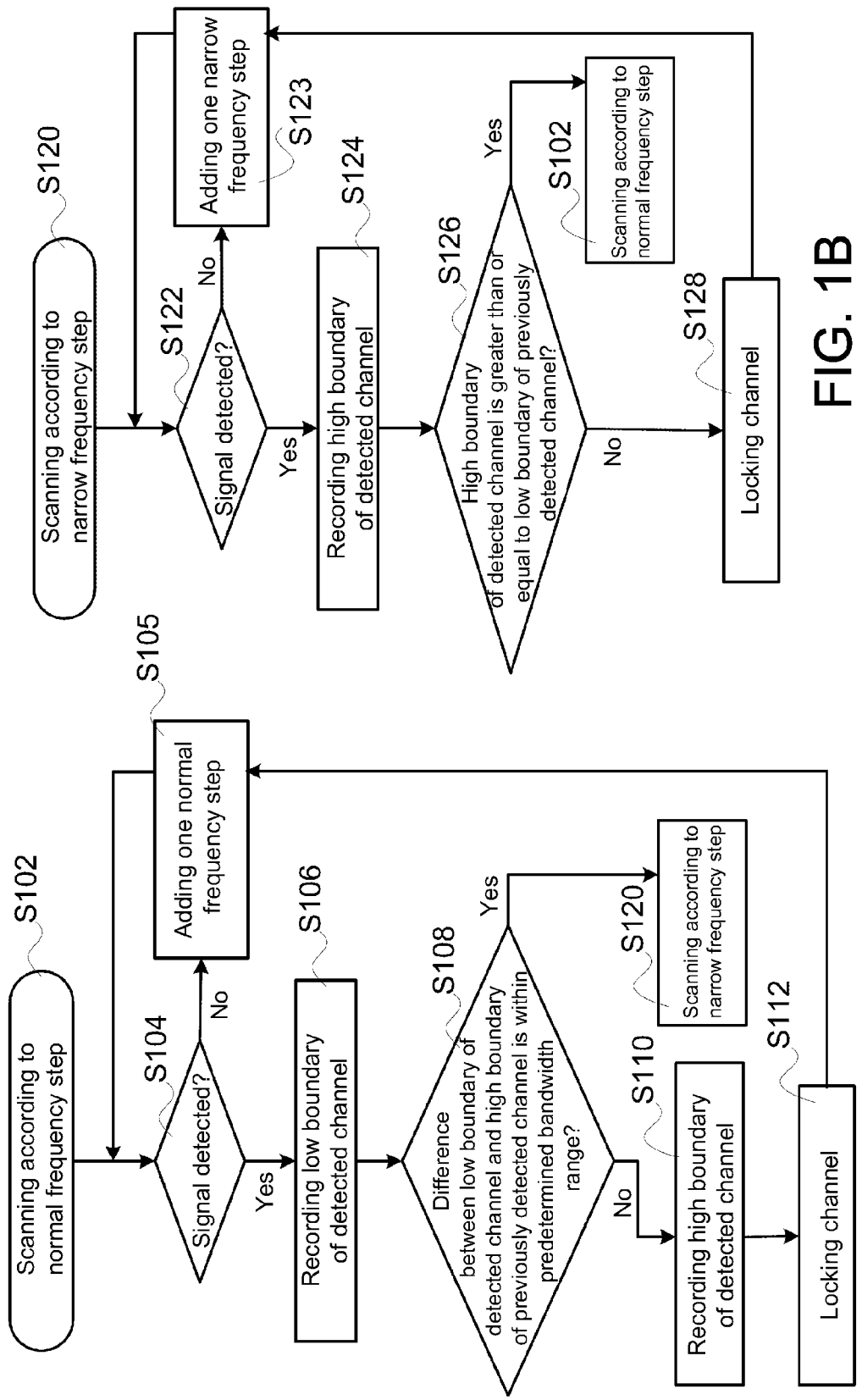

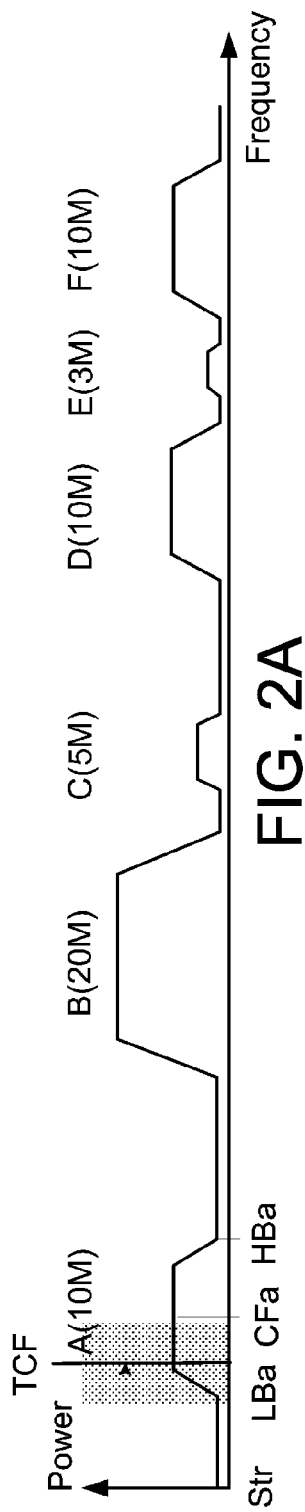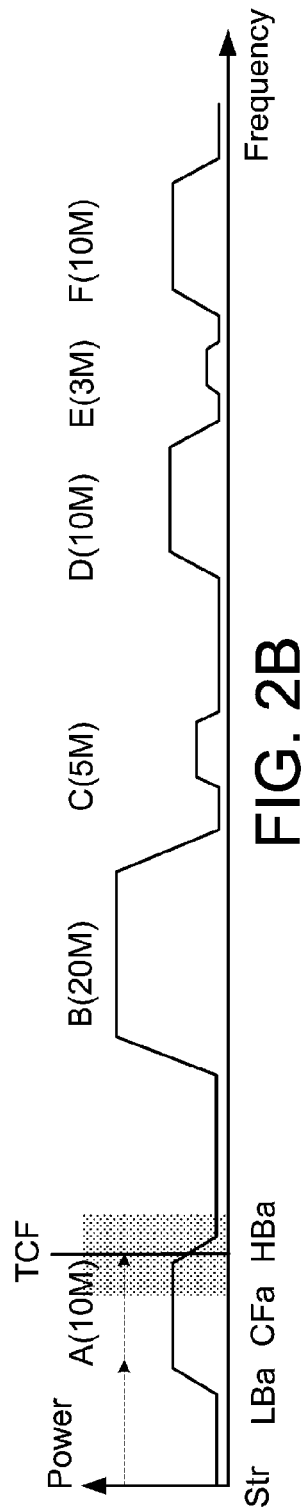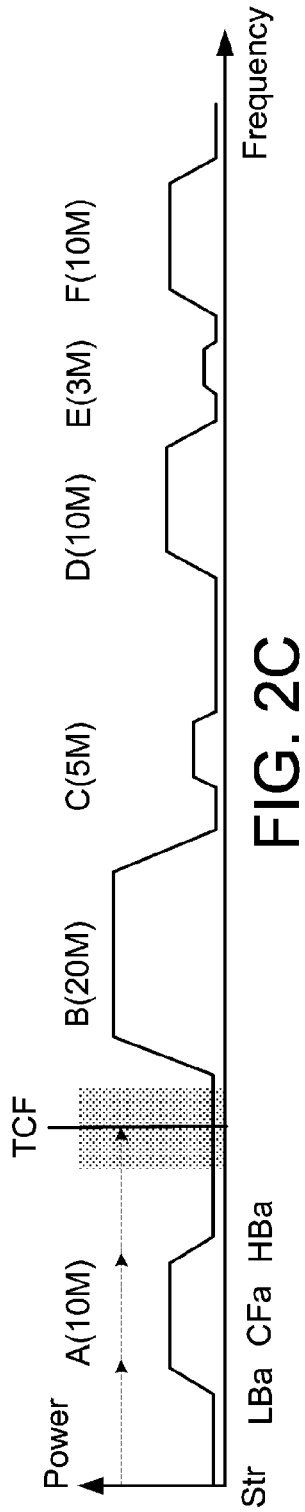

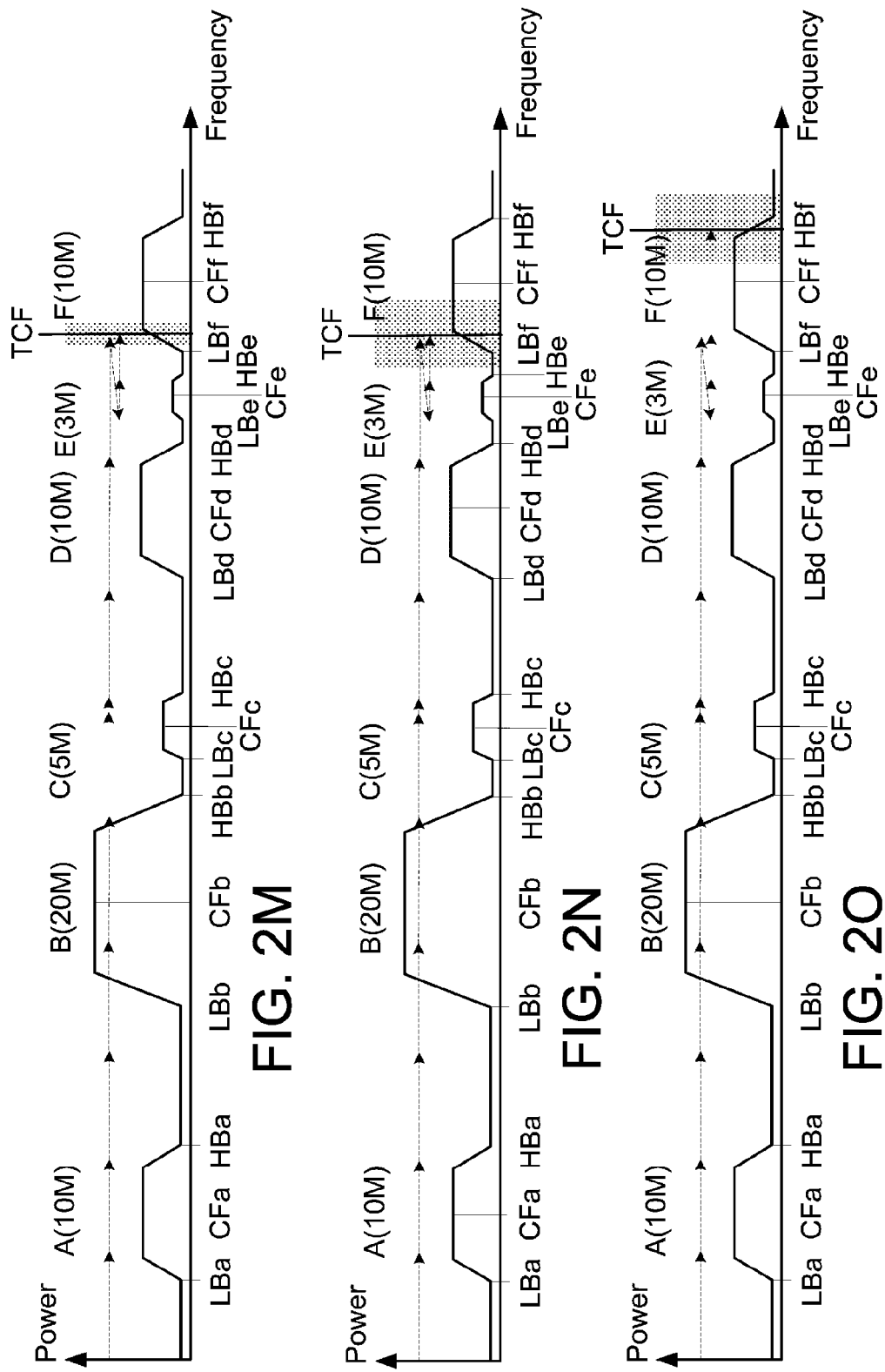

CHANNEL SCANNING METHOD FOR DIGITAL VIDEO BROADCASTING SATELLITE SIGNAL

This application claims the benefit of Taiwan application Serial No. 101145305, filed Dec. 3, 2012, the subject matter of which is incorporated herein by reference.

BACKGROUND OF THE INVENTION

1. Field of the Invention

The invention relates in general to a channel scanning method, and more particularly, to a channel scanning method for a Digital Video Broadcasting—Satellite First Generation/Second Generation (DVB-S/S2) signals.

2. Description of the Related Art

In a Digital Video Broadcasting—Satellite First Generation/Second Generation (DVB-S/S2) system, a center frequency and a symbol rate of a channel are unknown to a receiver. The symbol rate is a bandwidth of a channel. Due to differences in channel arrangements, channel scanning needs to be performed on radio frequency (RF) signals before viewing program contents carried by the RF signals.

In other words, in a DVB-S/S2 system, after scanning and demodulating a channel of the RF signals, the receiver learns channel parameters of the channel, including the center frequency and the symbol rate. The program contents can only be viewed after the scanning is complete and all channel parameters are confirmed. In the technical field, a blind scan approach is usually adopted to confirm the channel parameters. However, such approach suffers from an excessive scanning time in a way that program contents cannot be readily viewed. Therefore, there is a need for solution for effectively scanning all channel parameters in the RF signals in a DVB-S/S2 system.

SUMMARY OF THE INVENTION

It is an object of the present invention to provide a channel scanning method, for Digital Video Broadcasting—Satellite (DVB-S) signals, capable of quickly and completely detecting all channels in radio frequency (RF) signals.

The present invention provides a channel scanning method for DVB-S signals. The channel scanning method includes: scanning a radio frequency (RF) signal according to a normal frequency step; when an $N^{th}$ channel is detected, obtaining a difference between a low boundary of the $N^{th}$ channel and a high boundary of an $(N-1)^{th}$ channel; and, when the difference is within a predetermined bandwidth range, scanning the RF signal between the high boundary of the $(N-1)^{th}$ channel and the low boundary of the $N^{th}$ channel according to a narrow frequency step. The normal frequency step is greater than the narrow frequency step.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIGS. 1A and 1B are flowcharts of a channel scanning method according to an embodiment of the present invention;

DETAILED DESCRIPTION OF THE INVENTION

Figure 2D:
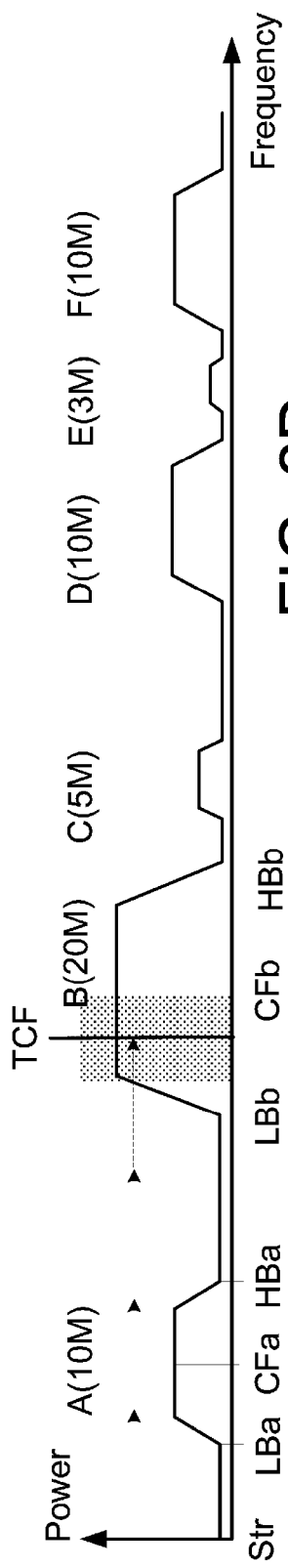
FIGS. 2A to 2O are schematic diagrams of an example of channel scanning according to an embodiment of the present invention.

According to an embodiment of the present invention, in a DVB-S/S2 system, a process of channel scanning is first performed according to a normal frequency step (10 MHz). To prevent from missing certain channels during the process, when a channel is detected and a band between a low boundary of the detected channel and a high boundary of a previous detected channel is within a predetermined bandwidth range, the process returns to the high boundary of the previous detected channel, selectively adds a predetermined frequency (2 MHz), and the channel scanning is repetitively performed according to a narrow frequency step (3 MHz) until the high boundary of the detected channel is greater than the low boundary of the previous detected channel. The process continues to perform the channel scanning again according to the normal frequency step.

In contrast, when a channel is detected, and the band between the low boundary of the detected channel and the high boundary of the previous detected channel is not within the predetermined frequency range, the channel scanning is continue performed according to the normal frequency step (10 MHz).

FIGS. 1A and 1B show flowcharts of a channel scanning method according to an embodiment of the present invention. In step S102, when channel scanning is initially performed, channels are scanned according to a normal frequency step. In step S104, it is determined whether a signal of a channel is detected in a detect range of a tuner center frequency. The process goes to Step S105 to add one narrow frequency step when no signal is detected, or else step S104 is iterated.

The process proceeds to Step S106 when a signal of a channel is detected within the detect range of the tuner center frequency in step S104. In step S106, the signal of the channel is demodulated, and a low boundary of the detected channel is recorded.

In step S108, it is determined whether a difference between the low boundary of the detected channel and a high boundary of a previous detected channel is within a predetermined bandwidth range. According to an embodiment of the present invention, the predetermined bandwidth range is 3 MHz to 12 MHz. The process proceeds to Step 120 to perform narrow frequency step scanning when a result of step S108 is affirmative.

On the contrary, when the result of step S108 is negative, the process proceeds to step S110 to record a high boundary of the detected channel. In step S112, the detected channel is locked. That is, the center frequency and the symbol rate of the detected channel are locked. The process returns to step S105 to add one normal frequency step (10 MHz), and then to step S104 to continue detecting a next channel.

In step S120, when performing the narrow frequency step scanning, the channel scanning is performed on the high boundary of a previous detected channel, selectively added with a predetermined bandwidth, according to a narrow frequency step. In the embodiment, the predetermined bandwidth is 2 MHz. That is, the tuner center frequency is adjusted back to the high boundary of the previously detected channel, selectively added with the predetermined bandwidth, and the detect range is reduced. In step S122, it is determined whether a signal of a channel is detected within the detect range. When no signal is detected in step S122, the process proceeds to step S123 to add one narrow frequency step (3 MHz) and then iterates step S122.

The process proceeds to Step S124 when a signal of a channel is detected within the detect range of the tuner center frequency in step S122. In step S124, the signal of the channel is demodulated, and the high boundary of the detected channel is obtained and recorded.

In step S126, it is determined whether the high boundary of the detected channel is greater than or equal to the detected channel detected by the previous normal frequency step scanning. That is, it is determined whether the high boundary of the detected channel is greater than or equal to the low boundary of the previous detected channel. Step S102 follows to perform the narrow frequency step scanning when a result of step S126 is affirmative.

On the contrary, when the result of step S126 is negative, the process proceeds to step S128 to lock the detected channel. That is, the center frequency and the symbol rate of the detected channel are locked. The process proceeds to step S123 to add one narrow frequency step (2 MHz), and then iterates step S122 to continue detecting a next channel.

To better understand the channel scanning method of the present invention, details of an example of channel scanning are given below with reference to FIGS. 2A to 2P. Referring to power in the schematic diagrams, the RF signals include six channels A, B, C, D, E and F, with bandwidths 10 MHz, 2 MHz, 5 MHz, 3 MHz, and 10 MHz, respectively. It is predetermined that a normal frequency step is 10 MHz, and a narrow frequency step is 3 MHz. In practice, given the normal frequency step is greater than the narrow frequency step, the above values for the normal frequency step and the narrow frequency step can be adjusted.

As shown in FIG. 2A, channel scanning is performed from a starting frequency Str (e.g., 950 MHz). At this point, one normal frequency step (10 MHz) is first added to a tuner center frequency TCF, and channel detecting is then performed. As shown, a shaded range covering before and after the tuning center frequency TCF is the detect range.

It is apparent that the detect range of the tuner center frequency TCF includes the channel A, which is thus detected. After demodulation, a low boundary LBa, a high boundary HBa, a center frequency CFa and a symbol rate of the channel A are obtained.

The low boundary LBa and the high boundary HBa are updated, and the channel A is locked. When locking the channel A, its parameters including the center frequency CFa and the symbol rate, are locked.

As the channel A is locked, the center frequency CFa and the symbol rate (i.e., the bandwidth) of the channel A are confirmed. Therefore, as shown in FIG. 2B, the tuner center frequency TCF is directly adjusted to a high cut-off frequency of the bandwidth where the channel A is located.

As shown in FIG. 2C, the channel scanning is continued starting from the high cut-off frequency of the channel A. At this point, one normal frequency step (10 MHz) is first added to the tuner center frequency TCF, and channel detecting is then performed. As shown, a shaded area covering before and after the tuner center frequency TCF is the detect range. The detect range does not include any channel, and thus no channel is detected.

As shown in FIG. 2D, one normal frequency step (10 MHz) is added to the tuner center frequency TCF to continue the channel detecting. As shown, the detect range of the tuner center frequency TCF at this point includes the channel B, which is thus detected. After demodulation, a low boundary LBb of the channel B is obtained.

The low boundary LBb is updated. Further, it is confirmed that difference between the low boundary LBb and the previous high boundary HBa is not within the predetermined bandwidth range (3 MHz to 12 MHz), i.e., a condition for narrow frequency step scanning is not satisfied. Therefore, a high boundary HBb of the channel B is updated, and the channel B is locked. When locking the channel B, its channel parameters including a center frequency CFb and the symbol rate are locked.

Figure 2E:
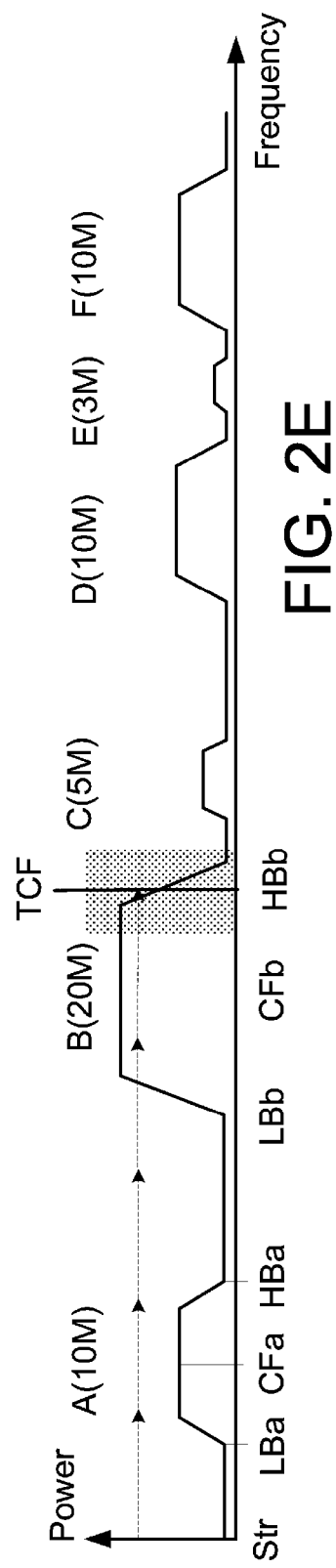

After locking the channel B, the center frequency CFb and the symbol rate of the channel B are confirmed. Thus, as shown in FIG. 2E, the tuner center frequency TCF is directly adjusted to a high cut-off frequency of the bandwidth where the channel B is located.

Figure 2F:
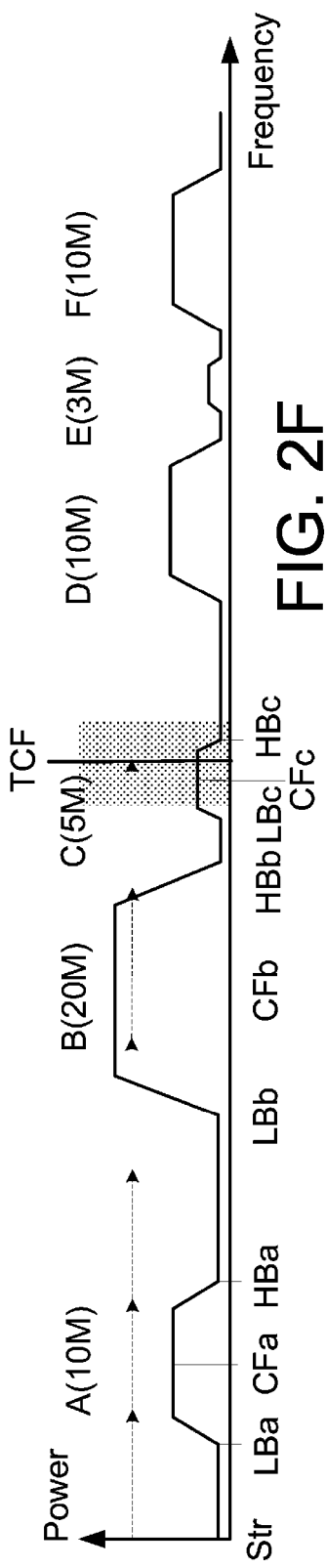

As shown in FIG. 2F, the channel scanning is continued starting from the high cut-off frequency of the channel B. At this point, one normal frequency step (10 MHz) is added to the tuner center frequency TCF, and channel detecting is then performed. As shown, the detect range of the tuner center frequency TCF at this point includes the channel C, which is thus detected. After demodulation, a low boundary LBc of the channel C is obtained.

The low boundary LBc is updated. Further, it is confirmed that difference between the low boundary LBc and the previous high boundary HBb is not within the predetermined bandwidth range (3 MHz to 12 MHz), i.e., the condition for narrow frequency step scanning is not satisfied. Therefore, a high boundary HBc of the channel C is updated, and the channel C is locked. When locking the channel C, its channel parameters including a center frequency CFc and the symbol rate are locked.

Figure 2G:
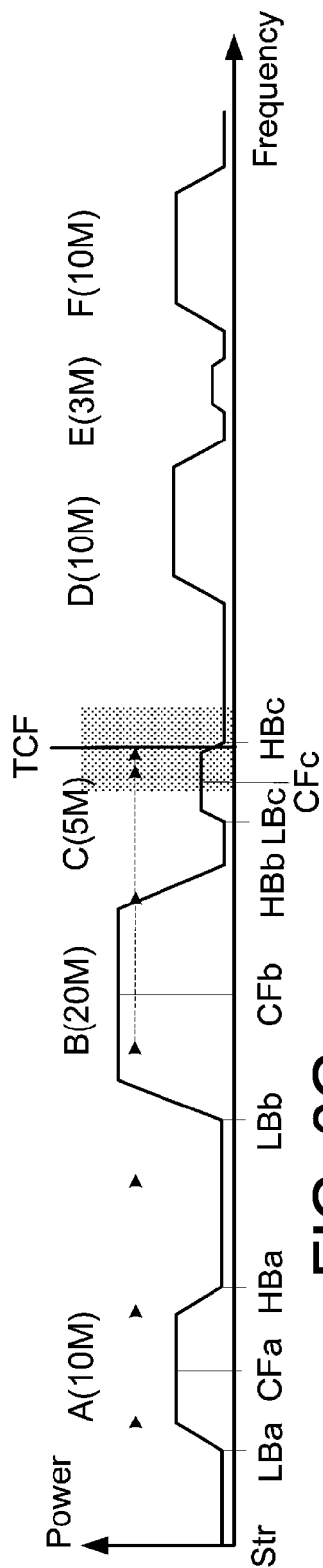

After locking the channel C, the center frequency CFc and the symbol rate of the channel C are confirmed. Thus, as shown in FIG. 2G, the tuner center frequency TCF is directly adjusted to a high cut-off frequency of the bandwidth where the channel C is located.

Figure 2H:
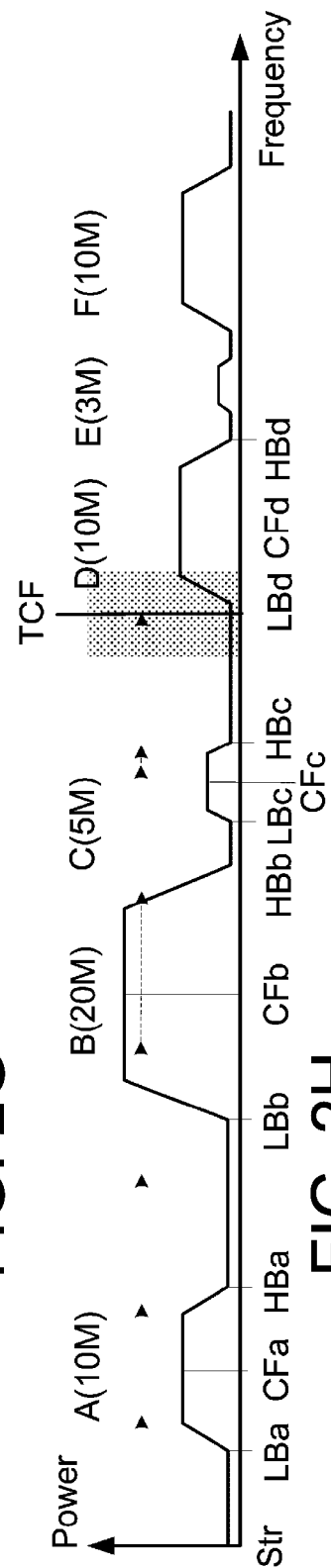

As shown in FIG. 2H, the channel scanning is continued starting from the high cut-off frequency of the channel C. At this point, one normal frequency step (10 MHz) is added to the tuner center frequency TCF, and channel detecting is performed. As shown, the detect range of the tuner center frequency TCF at this point includes the channel D, which is thus detected. After demodulation, a low boundary LBd of the channel D is obtained.

The low boundary LBd is updated. Further, it is confirmed that difference between the low boundary LBd and the previous high boundary HBc is not within the predetermined bandwidth range (3 MHz to 12 MHz), i.e., the condition for narrow frequency step scanning is not satisfied. Therefore, a high boundary HBd of the channel D is updated, and the channel D is locked. When locking the channel D, its channel parameters including a center frequency CFd and the symbol rate are locked.

Figure 2I:
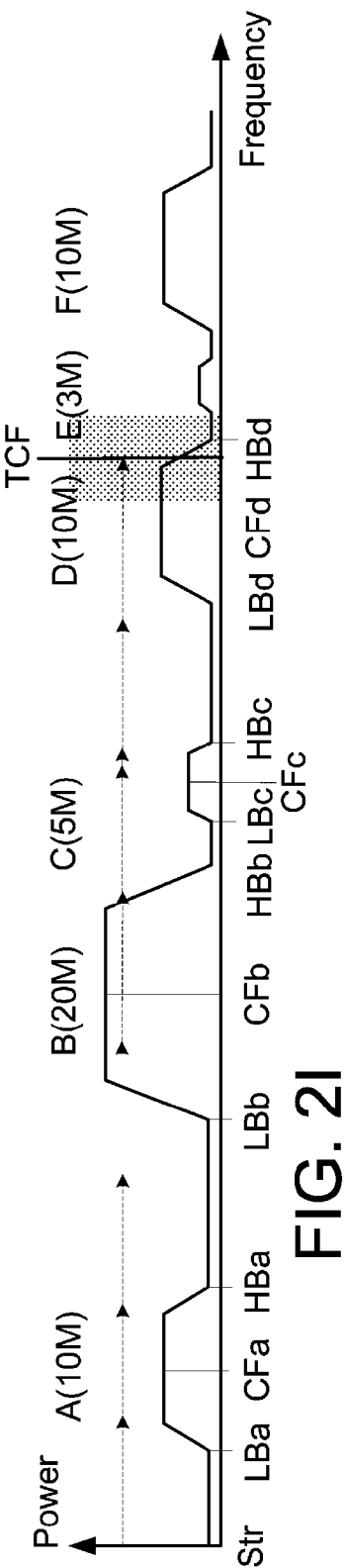

After locking the channel D, the center frequency CFd and the symbol rate of the channel D are confirmed. Thus, as shown in FIG. 2I, the tuner center frequency TCF is directly adjusted to a high cut-off frequency of the bandwidth where the channel D is located.

Figure 2J:
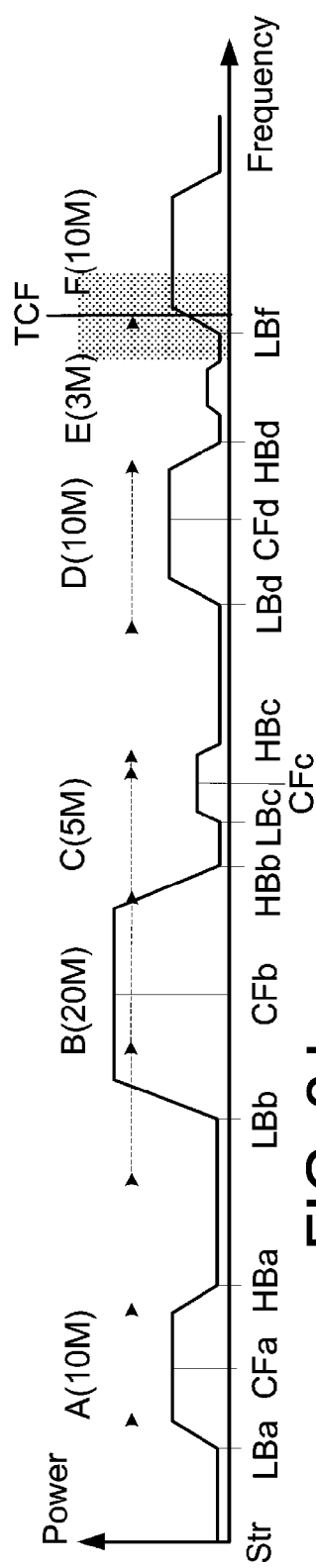

As shown in FIG. 2J, the channel scanning is continued starting from the high cut-off frequency of the channel D. At this point, one normal frequency step (10 MHz) is again added to the tuner center frequency TCF to perform the channel detecting. As shown, the detect range of the tuner center frequency TCF at this point includes the channel F, which is thus detected. After demodulation, a low boundary LBf of the channel F is obtained.

The low boundary LBf is updated. At this point, a difference between the low boundary LBf and the previous high boundary HBd is within the predetermined bandwidth range (3 MHz to 12 MHz), i.e., the condition for narrow frequency step scanning is satisfied. Therefore, the narrow frequency step scanning is performed.

When performing the narrow frequency step scanning, the tuner center frequency TCF is moved back to the previous high boundary HBd added by a predetermined bandwidth (2M), and the frequency scanning step range is reduced to a narrow frequency step (3M) to perform channel detecting.

Figure 2K:
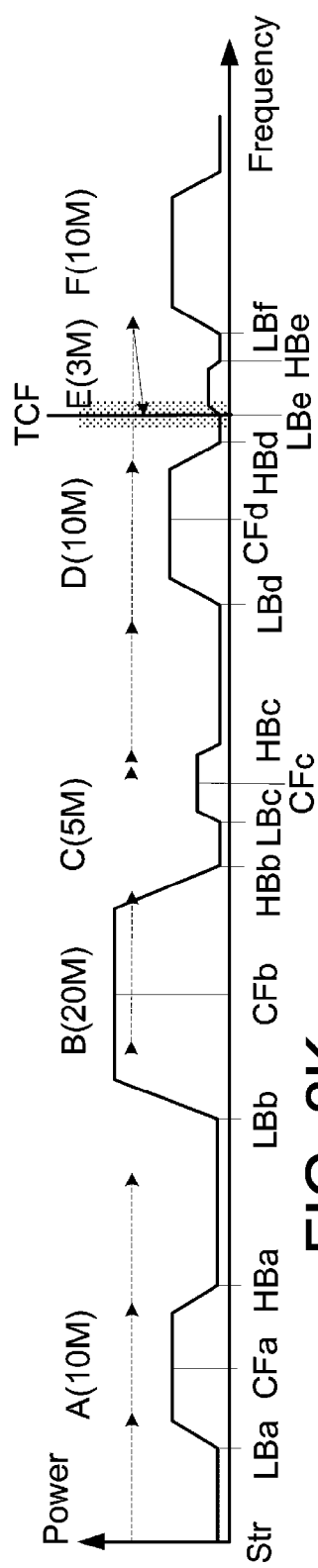

As shown in FIG. 2K, the detect range of the tuner center frequency TCF includes the channel E, which is thus detected. After demodulation, a high boundary HBe of the channel E is obtained.

The high boundary HBe is updated. Further, it is confirmed that the high boundary HBe is smaller than the previous low boundary LBf detected when last performing the normal frequency step scanning, i.e., the condition for the normal frequency interval scanning is not satisfied. Therefore, the channel E is locked. When locking the channel E, its channel parameters including a center frequency CFe and the symbol rate are locked.

Figure 2L:
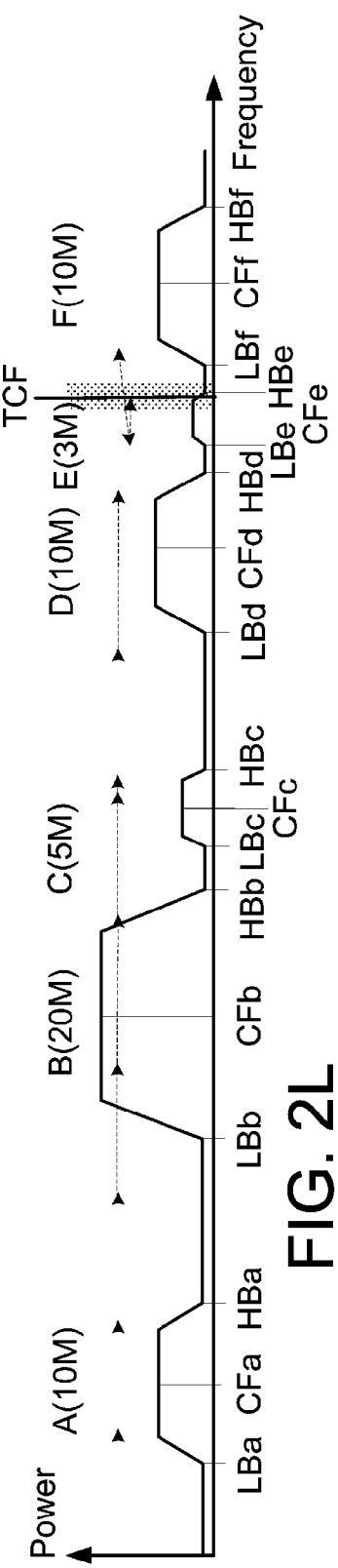

After locking the channel E, the center frequency CFe and the symbol rate of the channel E are confirmed. Thus, as shown in FIG. 2L, the tuner center frequency TCF is directly adjusted to a high cut-off frequency of the bandwidth where the channel E is located.

As shown in FIG. 2M, the channel scanning is continued starting from the high cut-off frequency of the channel E. At this point, one narrow frequency step (3 MHz) is added to the tuner center frequency TCF to perform the channel detecting. As shown, the search range of the tuner center frequency includes the channel F, which is thus detected. After demodulation, a high boundary HBf of the channel F is obtained.

The high boundary HBf is updated. Further, it is confirmed that the high boundary HBf is greater than the previous low boundary LBf, i.e., the condition of the normal frequency step scanning is satisfied, and so the condition for the normal frequency step scanning is restored.

As shown in FIG. 2N, the tuner center frequency TCF is not adjusted and the detect range is restored. As shown, the detect range of the tuner center frequency TCF includes the channel F, which is thus detected. After demodulation, the low boundary LBf of the channel F is obtained.

The low boundary LBf is updated. Further, it is confirmed that a difference between the low boundary LBf and the previous high boundary HBe is not within the predetermined bandwidth range (3 MHz to 12 MHz), i.e., the condition for narrow frequency step scanning is not satisfied. Therefore, a high boundary HBf of the channel F is updated, and the channel F is locked. When locking the channel F, its channel parameters including the center frequency CFf and the symbol rate are locked.

After locking the channel F, the center frequency CFf and the symbol rate of the channel F are confirmed. Thus, as shown in FIG. 2O, the tuner center frequency TCF is directly adjusted to a high cut-off frequency of the bandwidth where the channel F is located.

When all the channels are locked, the channel scanning of the present invention is complete.

Figure 3:
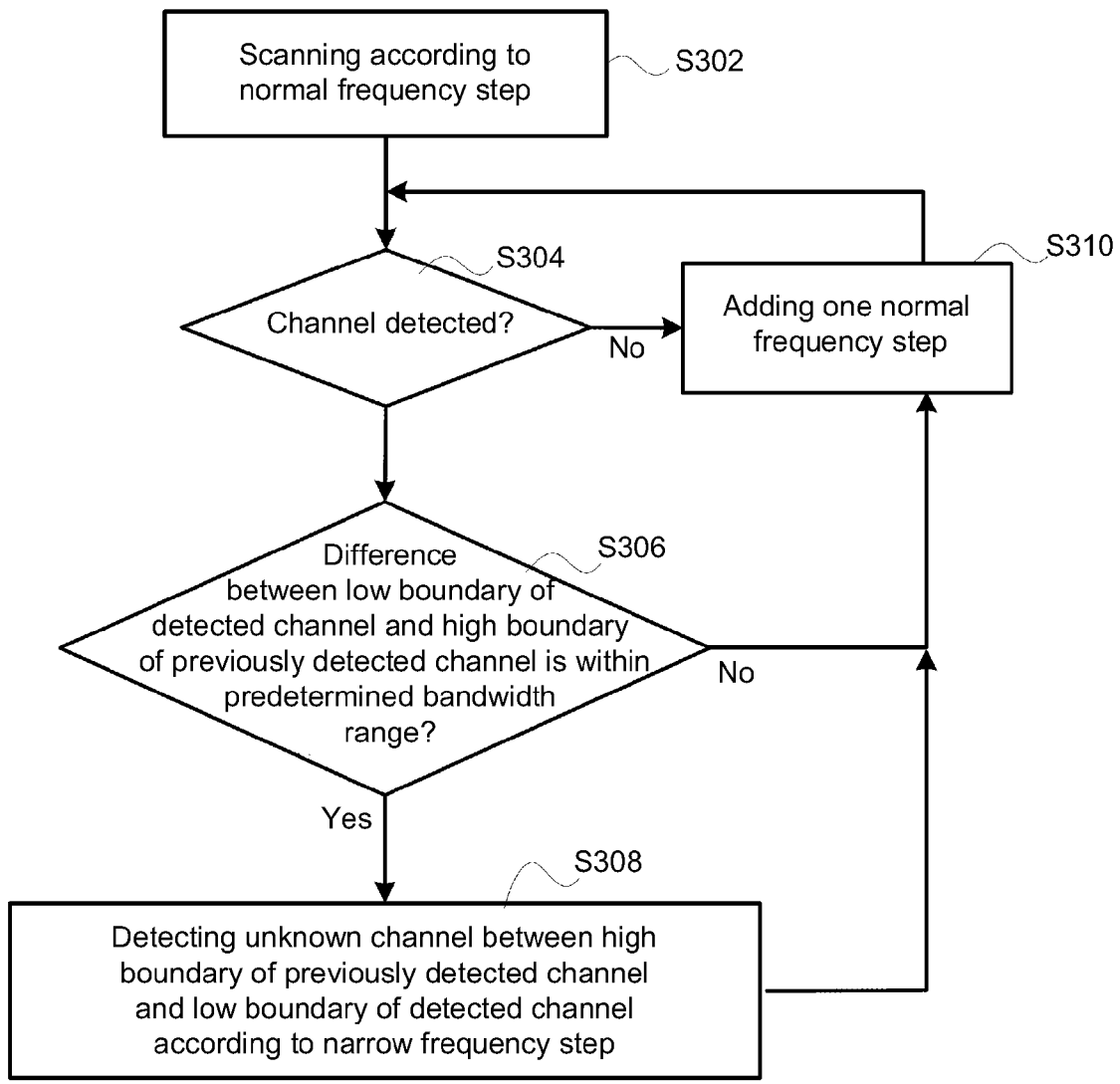
FIG. 3 is a flowchart of a channel scanning method according to another embodiment of the present invention.

As described above, a channel scanning method for DVB-S signals is provided by the present invention to completely detect all the channels in RF signals. The method may be simplified to a flowchart in FIG. 3. Referring to FIG. 3, in step S302, an RF signal is scanned according to a normal frequency step. When no channel is detected, in step S304, one normal frequency step is added to continue scanning the RF signal. When a channel is detected, a low boundary of the detected channel and a high boundary of a previously detected channel are obtained, and a difference between the two boundaries is determined. When the difference in step S306 is within a predetermined bandwidth range, in step S308, an unknown channel between the high boundary of the previously detected channel and the low boundary of the detected channel is scanned according to a narrow frequency step. When the difference in step S306 is not within the predetermined bandwidth range, in step S310, one normal frequency step is added to continue scanning the RF signal.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A channel scanning method for a Digital Video Broadcasting-Satellite (DVB-S) signal, comprising:
    scanning a radio frequency (RF) signal according to a normal frequency step;
    when an $N^{th}$ channel is detected, obtaining a difference between a low boundary of the $N^{th}$ channel and a high boundary of an $(N-1)^{th}$ channel; and
    when the difference is within a predetermined bandwidth range, scanning the RF signal between the high boundary of the $(N-1)^{th}$ channel and the low boundary of the $N^{th}$ channel according to a narrow frequency step;
    wherein, the normal frequency step is greater than the narrow frequency step.

2. The channel scanning method according to claim 1, wherein the step of scanning the RF signal according to the normal frequency step detects the RF signal within a first adjustment interval corresponding to a tuner center frequency.

3. The channel scanning method according to claim 2, wherein the step of scanning the RF signal according to the normal frequency step further comprises:
    when no channel signal is detected from the RF signal, relocating the tuner center frequency and the corresponding first adjustment interval by the normal frequency step, and again detecting the RF signal.

4. The channel scanning method according to claim 2, further comprising:
    when the difference falls out of the predetermined bandwidth range, recording the high boundary of the $N^{th}$ channel, locking the $N^{th}$ channel, relocating the tuner center frequency and the corresponding first adjustment interval by the normal frequency step, and iterating the step of scanning the RF signal according to the normal frequency step.

5. The channel scanning method according to claim 4, wherein locking the $N^{th}$ channel is locking a center frequency and a symbol rate of the $N^{th}$ channel.

6. The channel scanning method according to claim 1, wherein the step of scanning the RF signal according to the narrow frequency step detects the RF signal according to a tuner center frequency and a corresponding second adjustment interval.

7. The channel scanning method according to claim 6, wherein the step of scanning the RF signal according to the narrow frequency step further comprises:
    when no channel signal is detected from the RF signal, relocating the tuner center frequency and the corresponding second adjustment interval by the narrow frequency step, and again detecting the RF signal.

8. The channel scanning method according to claim 6, wherein the step of scanning the RF signal according to the narrow frequency step further comprises:
- when an $M^{th}$ channel is detected from the RF signal, recording a high boundary of the $M^{th}$ channel;
- when the high boundary of the $M^{th}$ channel is greater than or equal to the low boundary of the $N^{th}$ channel, iterating the step of scanning the RF signal according to the normal frequency step; and
- when the high boundary of the $M^{th}$ channel is smaller than the low boundary of the $N^{th}$ channel, relocating the tuner center frequency and the corresponding second adjustment interval by the narrow frequency step, and again detecting the RF signal.

9. The channel scanning method according to claim 8, wherein locking the $M^{th}$ channel is locking a center frequency and a symbol rate of the $M^{th}$ channel.

\* \* \* \* \*